United States Patent [19]

Dorius et al.

[11] Patent Number: 5,532,890
[45] Date of Patent: Jul. 2, 1996

[54] NEGATIVE PRESSURE SLIDER WITH OPTIMIZED LEADING POCKET FOR PROFILE CONTROL

[75] Inventors: Lee K. Dorius; Laurence S. Samuelson, both of San Jose, Calif.

[73] Assignee: International Business Machines Corporation, Armonk, N.Y.

[21] Appl. No.: 486,539

[22] Filed: Jun. 7, 1995

Related U.S. Application Data

[62] Division of Ser. No. 149,861, Nov. 10, 1993.

[51] Int. Cl.[6] .............................. G11B 5/60; G11B 21/21
[52] U.S. Cl. ............................................................ 360/103
[58] Field of Search .............................................. 360/103

[56] References Cited

U.S. PATENT DOCUMENTS

| | | | |
|---|---|---|---|
| 3,855,625 | 12/1974 | Garnier et al. | 360/103 |
| 4,218,715 | 8/1980 | Garnier | 360/103 |
| 4,475,135 | 10/1984 | Warner et al. | 360/103 |
| 4,636,894 | 1/1987 | Mo | 360/103 |
| 4,984,114 | 1/1991 | Takeuchi et al. | 360/103 |
| 5,062,017 | 10/1991 | Strom et al. | 360/103 |
| 5,128,822 | 7/1992 | Chapin et al. | 360/103 |
| 5,196,973 | 3/1993 | Chapin et al. | 360/103 |
| 5,200,868 | 4/1993 | Chapin et al. | 360/103 |
| 5,210,666 | 5/1993 | Chapin et al. | 360/103 |
| 5,218,494 | 6/1993 | Chapin et al. | 360/103 |
| 5,218,495 | 6/1993 | Chapin et al. | 360/103 |
| 5,220,470 | 6/1993 | Ananth et al. | 360/103 |

FOREIGN PATENT DOCUMENTS 61-148684  12/1984  Japan.

*Primary Examiner*—Robert S. Tupper
*Attorney, Agent, or Firm*—Ingrid M. Foerster

[57] ABSTRACT

Disclosed is a negative pressure air bearing slider having at least one trailing edge pocket defined by a generally U-shaped rail open to the trailing edge of the slider, and at least one leading edge pocket defined by a generally U-shaped rail open to the leading edge of the slider. Also disclosed is a method for determining an optimal width for a leading edge pocket of predetermined length and depth to provide a flat fly height profile in combination with a trailing edge pocket of predetermined dimensions. For a given trailing edge pocket configuration, width optimization is achieved by constructing a number of prototype sliders, each having a unique leading to trailing edge pocket width ratio; measuring the inner and outer diameter fly heights for each prototype to obtain ID and OD fly height profile curves; and determining a leading edge pocket width corresponding to the point of intersection of the curves.

6 Claims, 9 Drawing Sheets

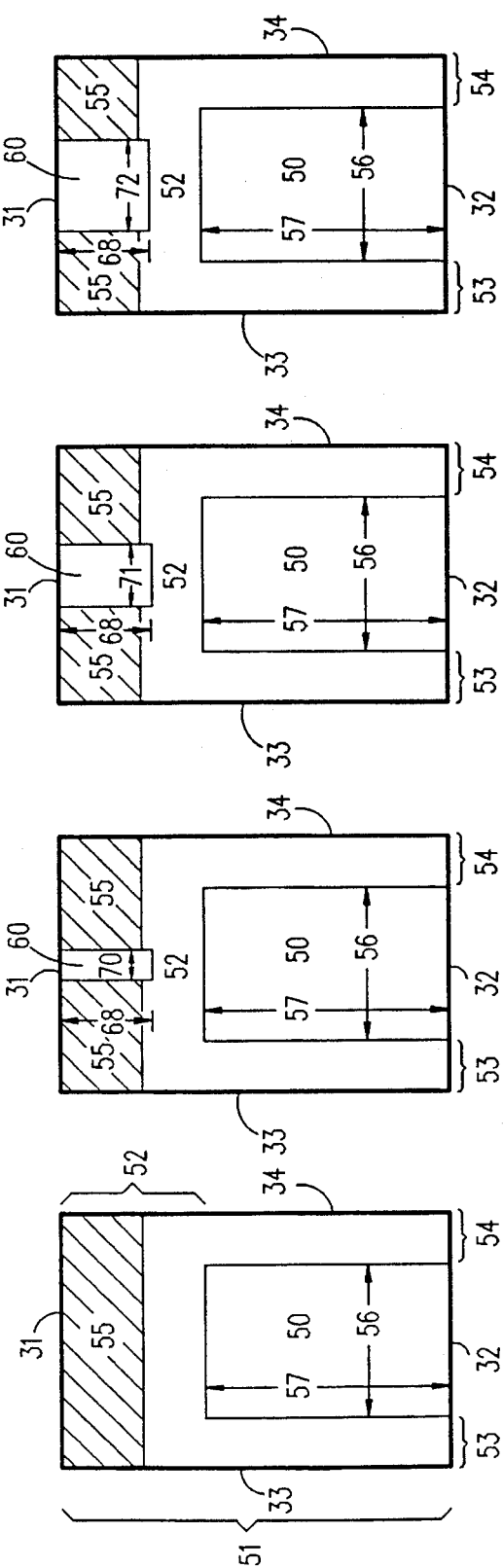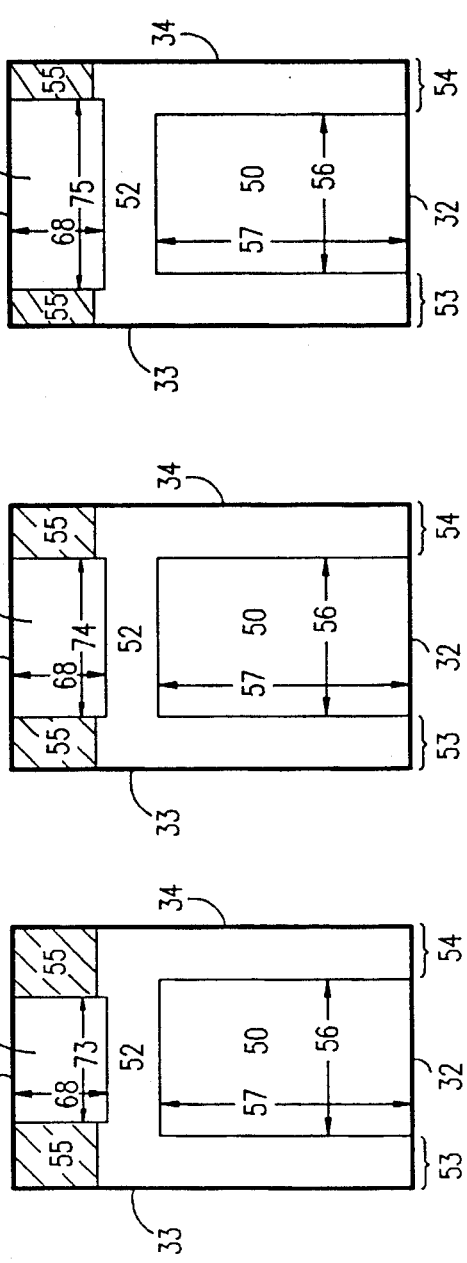

NEGATIVE PRESSURE SLIDER WITH OPTIMIZED LEADING POCKET FOR PROFILE CONTROL

This application is a division of application Ser. No. 08/149,861, filed on Nov. 10. 1993, pending entitled "NEGATIVE PRESSURE SLIDER WITH OPTIMIZED LEADING POCKET FOR PROFILE CONTROL", in the names of Lee K. Dorius and Laurence S. Samuelson.

BACKGROUND OF THE INVENTION

The present invention relates generally to negative pressure air bearing sliders for use in a disk drive, and more particularly to a negative pressure slider having one or more trailing edge pockets in combination with one or more optimized leading edge pockets for a flat fly height profile.

Conventional "positive" air bearing sliders ride on a cushion of air generated by the rotation of a magnetic disk. The upward force on the slider provided by the air Cushion is directly proportional to rotational velocity, and hence varies from the inner disk diameter (ID), to the outer disk diameter (OD). Since air bearing sliders tend to be sensitive to such changes in upward force, their fly height will vary across the disk. A plot showing the variation in a slider's flying height from the ID to OD represents the "fly height profile" of that slider. It is generally desirable to optimize a slider to provide a flat fly height profile.

Typically, a positive air bearing slider displays an increase in fly height with increasing velocity. To obtain a more constant fly height profile, some slider designs include a trailing edge negative pressure "pocket". The pocket is generally formed by providing a cross-bar between the "catamaran" rails of a slider, thereby forming a U-shaped air bearing surface (ABS) opening out to the slider's trailing edge. A slider having a negative pressure pocket is referred to in the art as a negative pressure air bearing slider. An example of one such negative pressure air bearing slider is disclosed in U.S. Pat. No. 4,475,135.

Although U-shaped negative pressure air bearing sliders are an improvement over positive pressure designs, their fly height profiles still tend to increase with increasing velocity. This tendency is due to the fact that the negative pressure generated by the pocket cannot fully compensate for the positive pressure of the catamaran rails. To counteract this problem, some negative pressure sliders include a second U-shaped pocket opening out to the leading edge of the slider. This type of negative pressure slider has a generally H-shaped ABS. The leading edge pocket channels more air over the cross-bar, thereby generating greater negative pressure in the trailing edge pocket to improve its efficiency. An example of one such negative pressure slider is disclosed in U.S. Pat. No. 3,855,625.

One problem associated with H-shaped designs, however, is overcompensation resulting from the generation of too much negative pressure. A leading edge pocket having the same width as the trailing edge pocket generally has a linear fly height profile showing decreasing fly height from ID to OD. One solution has been to vary the etch depth of the trailing edge pocket to even out the profile. This design requires a more complex manufacturing process than a slider with pockets at the same etch depth. Another alternative has been to recess the cross bar between the catamaran rails. The recessed cross bar permits air flow from the leading edge pocket to vent into the trailing edge pocket, thereby decreasing the efficiency of the latter.

A slider having a recessed cross-rail is disclosed in U.S. Pat. No. 4,218,715. But this alternative also requires a more complicated manufacturing process. What is needed is a method for optimizing the leading and trailing edges pockets of a negative pressure slider having substantially the same etch depth.

As an additional consideration, the negative pressure air bearing sliders described above produce large negative loads, and hence have high stiffness. Consequently, disk degradation due to slider impact with asperities is increased. A number of alternative negative pressure air bearing sliders optimize the amount of negative pressure while retaining the benefits of negative pressure designs. Optimization mechanisms include reduction in pocket size, positioning of the pocket, and distribution of the negative load between two or more pockets. Application Ser. No. 7/967,359 filed on October 28, 1992 discloses such optimized designs and is incorporated herein by reference. What is needed, for a given trailing edge pocket slider design and in a disk drive having given inner and outer diameter fly height tolerences, is a method for determining a leading edge pocket design optimized to provide a desired slider fly height profile.

SUMMARY OF THE INVENTION

The present invention relates to a method for optimizing the fly height profile of a negative pressure air bearing slider having leading and trailing edge pockets of substantially equal etch depth, and proposed optimized negative pressure slider designs. An optimal leading edge pocket width is empirically selected by plotting fly height versus leading edge to trailing edge pocket width ratio for a slider positioned at the ID and a slider positioned at the OD. A leading edge pocket width is then selected which corresponds to a desired fly height variation between the two curves.

It is therefore an object of the present invention to provide a method for optimizing the fly height profile of a negative pressure air bearing slider which is suitable for a variety of trailing edge pocket configurations.

It is a further object of the present invention to optimize the slider's fly height profile by forming one or more leading edge pockets on the ABS, each having an optimized width for a desired leading edge pocket depth and length.

It is yet another object of the present invention to empirically determine a leading edge to trailing edge pocket width ratio which minimizes slider fly height profile variation.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like components and in which:

FIGS. 4(a)–(g) are plan views of a negative pressure air bearing slider having a trailing edge pocket of fixed dimensions and a leading edge pocket of varying width.

DESCRIPTION OF THE PREFERRED EMBODIMENT

Figure 1:
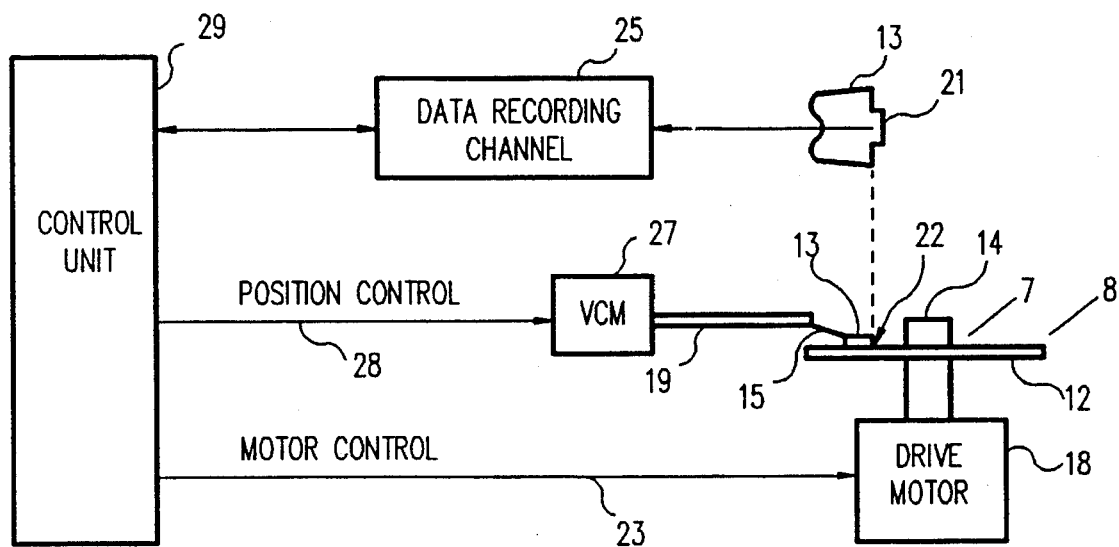
FIG. 1 is a simplified block diagram of a magnetic disk storage system embodying the present invention.

Referring now to FIG. 1, a magnetic disk storage system comprises at least one rotatable magnetic disk 12 supported on a spindle 14 and rotated by a disk drive motor 18 with at least one slider 13 positioned on the disk 12, each slider 13 supporting one or more magnetic read/write transducers 21, typically referred to as read/write heads. The magnetic recording media on each disk is in the form of an annular pattern of concentric data tracks (not shown) on disk 12. The location of the innermost data track on disk 12 is sometimes referred to as the "inner diameter" or ID 7 of the disk 12. Similarly, the location of the outermost data track is sometimes called the "outer diameter" or OD 8. As the disks 12 rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
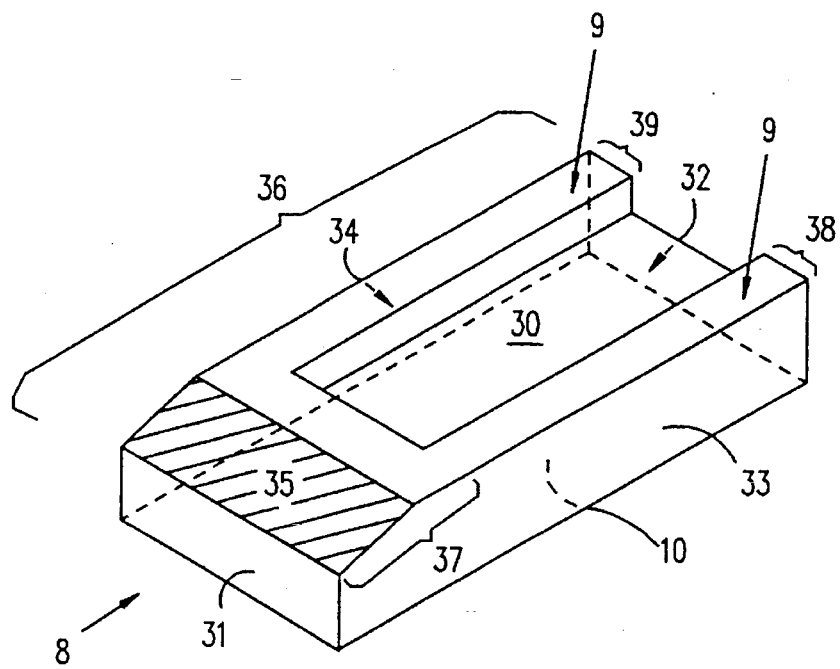
FIG. 2 is a perspective view of a negative pressure air bearing slider with a trailing edge pocket.

FIG. 2 shows a negative pressure air bearing slider which has been used with magnetic storage systems such as the system of FIG. 1. The slider includes a lower surface 9, an upper surface 10, leading and trailing edges 31, 32, and left and right side edges 33, 34. In normal system operation, the lower surface 9 is facing downward as the slider 13 flies in close proximity to the magnetic recording disk 12. The lower surface 9 shown comprises an inverted U-shaped rail 36 defining a trailing edge (TE) negative pressure recess or pocket 30. Rail 36 includes a cross rail 37 and a pair of side rails 38, 39. The cross rail 37 has a tapered region 35 at the leading edge (LE) 31 of the slider 13 to assist initial lift-off. In operation, as the disk 12 begins to rotate, air flow generated by the rotation travels across lower surface 9 in the direction of the arrow 8, thereby exerting a positive pressure on rail 36 sufficient to lift the slider 13 off of the disk. Simultaneously, a negative, suction-like pressure is generated by air flowing into the TE pocket 30 to counteract the positive force and stabilize the slider against changes in velocity.

Figure 3:
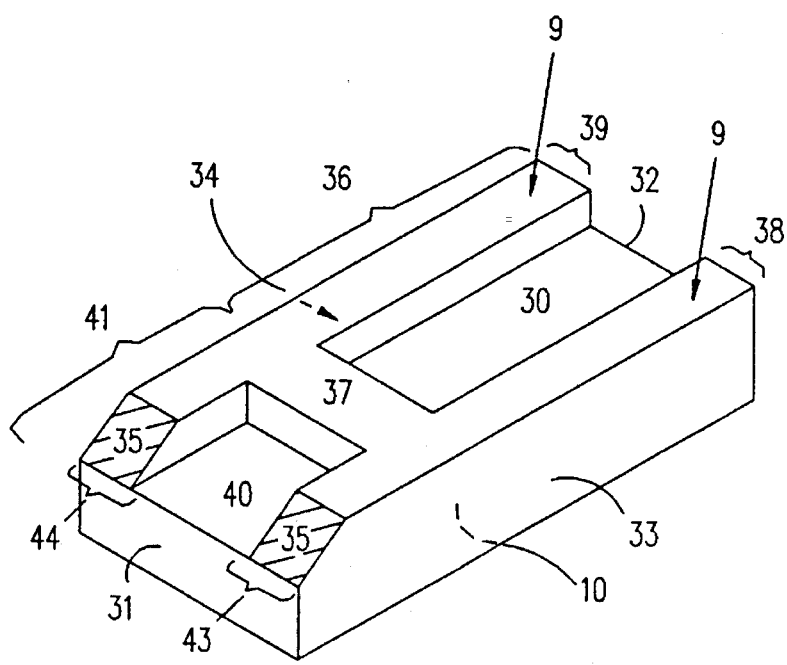
FIG. 3 is a perspective view of a negative pressure air bearing slider with leading and trailing edge pockets of equal width and depth.

FIG. 3 shows an alternative negative pressure air bearing slider which has also been used with storage systems such as that of FIG. 1. The lower surface 9 of this slider comprises a U-shaped rail 41 defining a leading edge (LE) recess or pocket 40, and an abutting inverted U-shaped rail 36 defining a TE pocket 30. The LE rail 41 shares a common cross rail 37 with the TE rail 36, and further includes left and right side rails 43, 44, each having a tapered portion 35 along leading edge 31. In the embodiment shown, LE pocket 40 and TE pocket 30 are of substantially equal width. In operation, LE pocket 40 enhances the effect of the negative pressure generated in TE pocket 30 in proportion to increasing velocity, i.e., as the slider moves from ID to OD.

FIGS. 4(a)–(g) and 5 illustrate an example of the optimization method according to the present invention. The process begins by selecting a negative pressure air bearing slider with a desired TE pocket configuration. For illustration purposes, the simple negative pressure slider of FIG. 4(a) is selected. The slider has a single TE pocket 50 of fixed depth and fixed width 56 defined by inverted U-shaped rail 51. TE rail 51 includes cross rail 52 with tapered portion 55 adjacent to the leading edge 31, and left and right side rails 53, 54 extending perpendicularly from cross rail 52 to the trailing edge 32. The left and right side rails 53, 54 are adjacent to the left and right side edges 33, 34 of the slider, respectively.

Next, a series of prototypes are formed by conventional methods with the same TE pocket dimensions as the selected slider, and also including LE pockets of fixed depth and length, but of varying widths. The LE pockets may be formed by the same conventional methods, e.g., by chemical etching, reactive ion etching (RIE), or ion milling. In the example given, the LE pocket widths of the prototypes shown in FIGS. 4(b)–(g) have been carefully selected to provide sliders with LE to TE pocket width ratios of 0.2, 0.4, 0.6, 0.8, 1.0 and 1.2, respectively. For example, FIG. 4(b) shows a prototype having a TE pocket 50 identical to that of FIG. 4(a), and a LE pocket 60 of fixed depth, a fixed length 68 and a selected width 70. The ratio of LE pocket width 70 to TE pocket width 56 is 0.2. For simplicity of manufacture, the LE pocket depth may be equal to that of the TE pocket 50, but this is a matter of preference rather than a requirement of the method disclosed.

Next, each prototype slider is flown over a recording disk in order to measure its average fly height at ID and OD. The fly height information is then recorded on a plot such as that shown in FIG. 5. The horizontal axis 82 represents increasing LE to TE pocket width ratios ranging from 0.0 to 1.4, and the vertical axis 81 represents average slider fly height in nanometers. For example, the prototype slider of FIG. 4(b) was experimentally found to have an average fly height of approximately 85 nm at the ID, represented by point 86, and an average fly height of approximately 175 nm at the OD, indicated by point 85. After the ID and OD fly heights for each prototype have been measured, two curves 83, 84 are obtained. Curve 83 is obtained by connecting the points representing the OD fly heights measured for each slider prototype. It provides an approximation of OD fly height variation for a slider of fixed TE pocket dimensions and increasing LE pocket widths at fixed depth. Similarly, curve 84 approximates the ID fly height variation for a slider of fixed TE pocket dimensions and increasing LE pocket widths at fixed depth.

Figure 6:
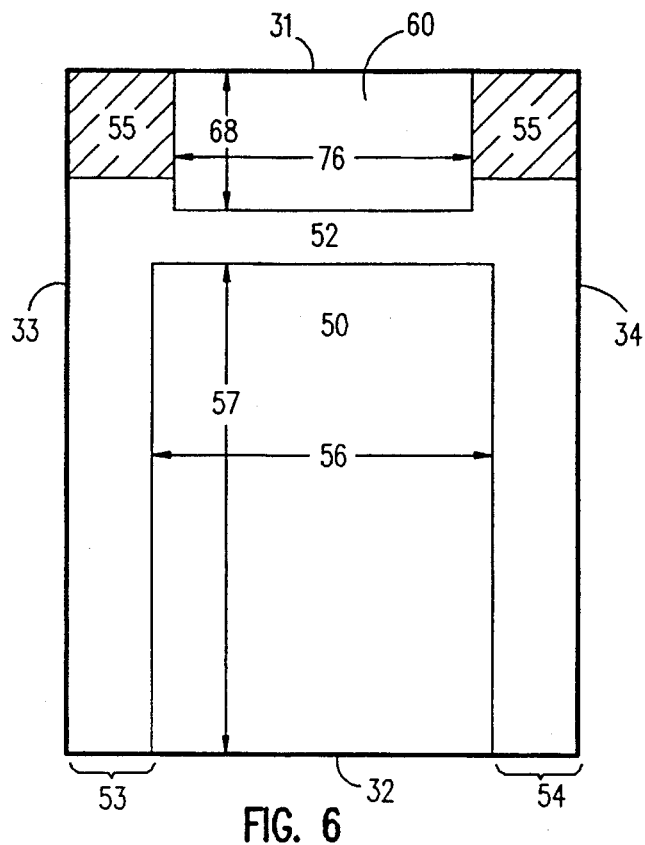
FIG. 6 is a preferred embodiment of the present invention having a trailing edge pocket and a leading edge pocket of optimal width.

The intersection of the curves 83, 84 occurs at a point 87 in which the ID and OD average fly heights for a given LE pocket width are approximately equal. The pocket width ratio 88 corresponding to the point of intersection 87 provides the optimal slider configuration for the selected slider to provide a flat fly height profile from ID to OD. In the example given, a LE to TE pocket width ratio of approximately 0.9 was found to correspond to intersection point 88. Using this information, an optimized slider may now be manufactured. FIG. 6 shows the optimized slider design obtained in the foregoing example. TE pocket 50 is identical to that of FIG. 4(a). The depth and length 68 of LE pocket 60 are fixed at the same dimensions selected for the prototypes of FIGS. 4(b)–(g), but the width 76 has been carefully selected so that the ratio of LE pocket width 76 to TE pocket width 56 is approximately 0.9. Although the prototypes of the foregoing example were chosen to provide LE to TE pocket width ratios in increments of 0.2, it should be understood that increments of smaller or larger dimension may be selected, depending on the precision desired in a particular case.

Figure 5:
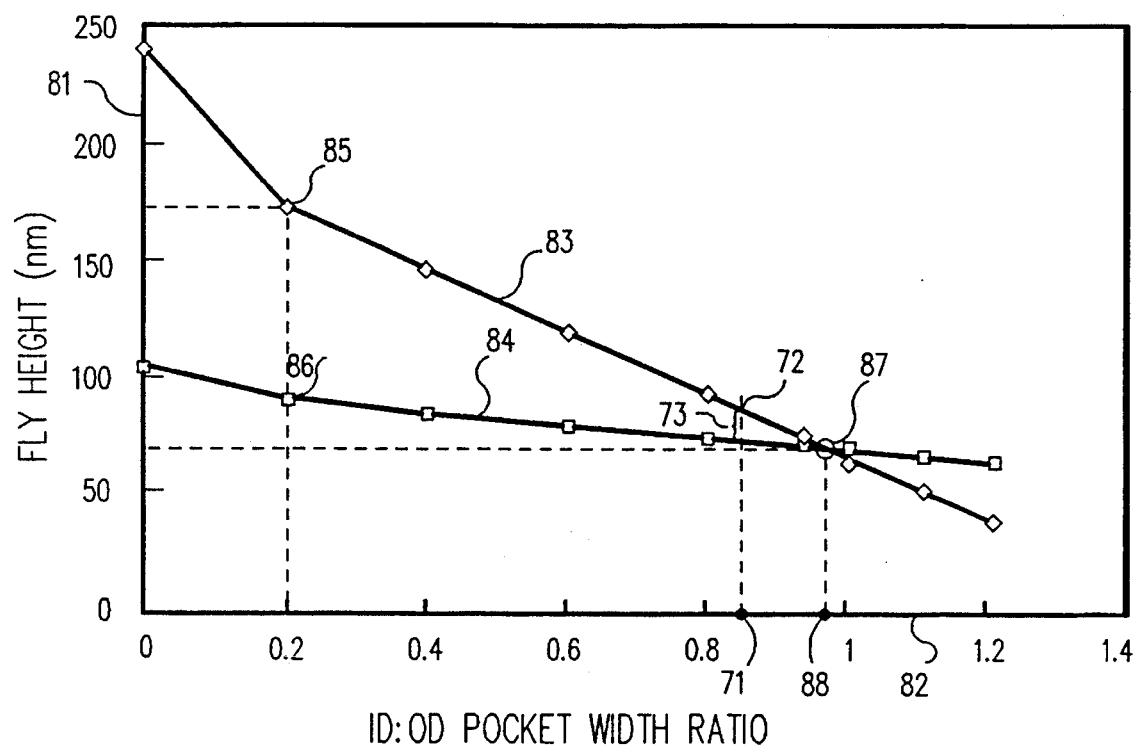
FIG. 5 is a graph showing the inner and outer diameter fly height curves for a slider laving a trailing edge pocket of fixed dimensions and varying leading edge widths.

In some disk drives, variations in fly height tolerances between ID and OD make it desirable to select a pocket width ratio corresponding to some point ocher than the point at which average ID and OD fly heights for a fixed LE pocket width are equal. For example, in a disk drive with different ID and OD fly height tolerances, an optimal slider may be one in which the average ID and OD fly heights vary by 10 nm. In such cases, a pocket width ratio is selected which corresponds to the desired variation between the average ID and OD fly height curves. Referring to FIG. 5, dashed line 72 references the pocket width ratio 71 approximately corresponding to a 10 nm variation between the curves 83, 84. Hence, pocket width ratio 71 provides the optimal LE pocket width for the given tolerances of this case.

Figure 7:
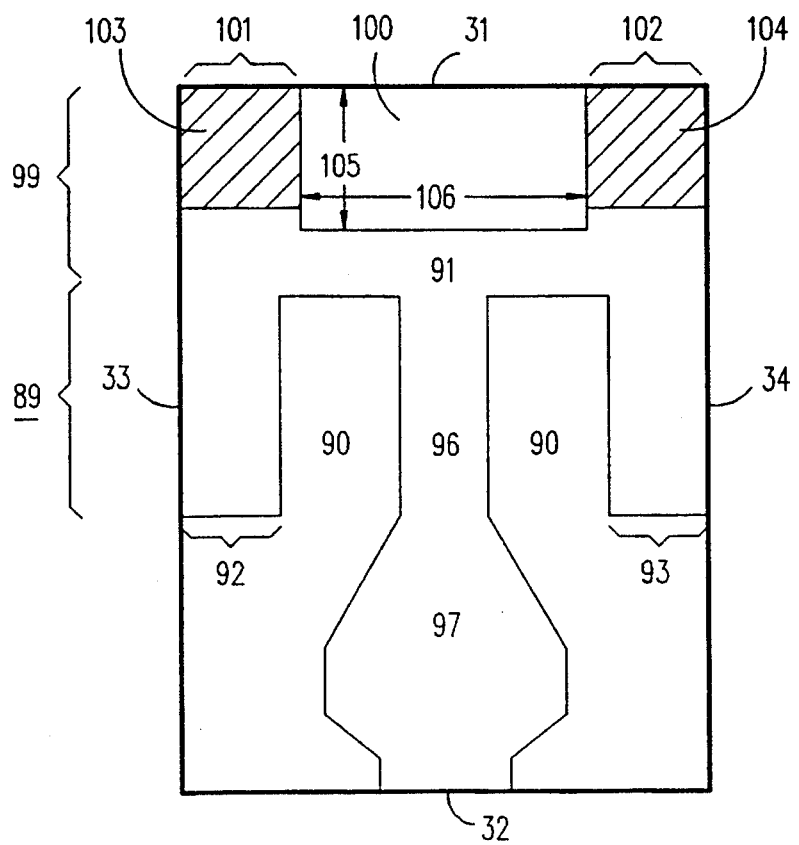
FIGS. 7–17 are alternative preferred embodiments of the present invention having one or more trailing edge pockets and one or more leading edge pockets of optimized total width.

FIGS. 7–14 show negative pressure sliders with various TE pocket configurations which further include one or more leading edge pockets optimized according to the present invention. The slider of FIG. 7 has a LE pocket 100 defined by a U-shaped rail 99, and a TE pocket 90 defined by an inverted U-shaped rail 89 abutting rail 99. The left and right side rails 101, 102 of rail 99 are adjacent to left and right side edges 33, 34, respectively, and include tapered portions 103, 104 adjacent to the slider's leading edge 31. The TE rail 89 shares a common cross rail 91 with LE rail 99. It further includes left and right side rails 92, 93 which extend perpendicularly from common cross rail 91 in the direction of the trailing edge 32 along left and right side edges 33, 34, respectively. TE pocket 90 is bisected by a center rail 96 extending perpendicularly from the center of cross rail 91. The center rail 96 balloons into an island 97 adjacent to and centered with respect to the trailing edge 32. The island 97 provides a convenient surface for supporting a magnetic transducer (not shown). An optimized LE pocket width 106 was chosen by applying the optimizing method described above. A number of prototype sliders were constructed with the same TE pocket configuration as shown in. FIG. 7, and with LE pockets of fixed depth and length 105, but of varying widths. The ID and OD fly heights for each prototype were measured and curves similar to those of FIG. 5 were plotted. The ID and OD curves were found to intersect at a point corresponding to optimal LE pocket width 106.

Figure 9:
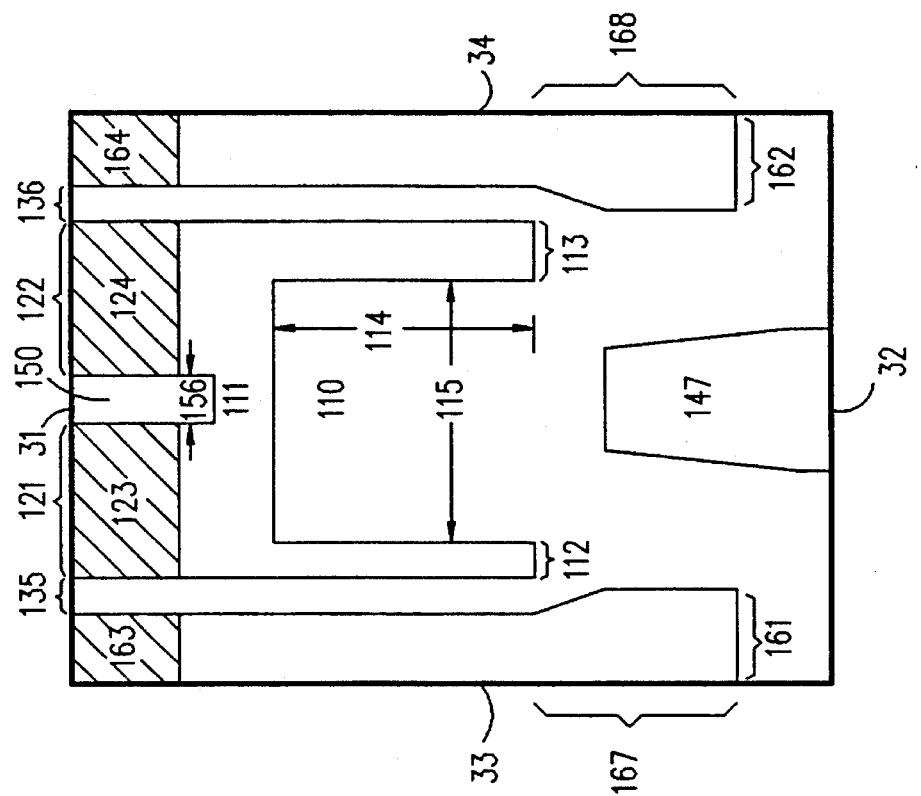
Figure 8:
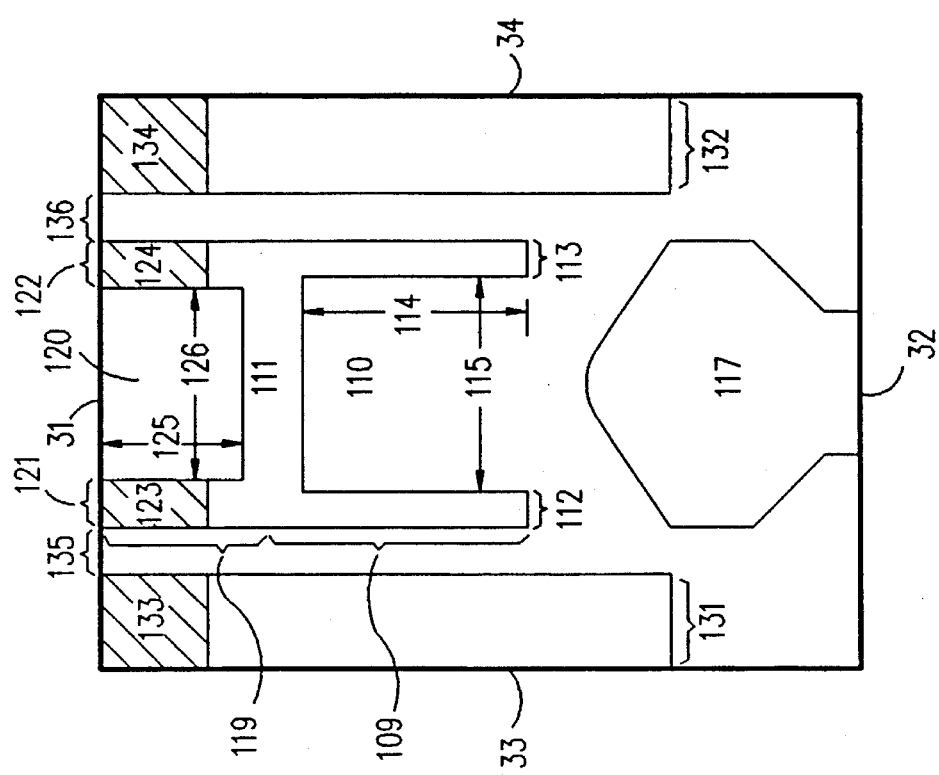

FIGS. 8 and 9 show negative pressure air bearing sliders having an alternative TE pocket configuration. In FIG. 8, pair of catamaran-type side rails 131, 132 extend perpendicularly from leading edge 31 along left and right side edges 33, 34 in the direction of trailing edge 32. Each catamaran rail 131, 132 includes a tapered portion 133, 134 adjacent to the leading edge 31 to assist slider lift-off U-shaped rail 119 and abutting inverted U-shaped rail 109 are disposed in between the catamaran rails 131, 132 and define leading and trailing edge pockets 120, 110. Rails 119 and 109 are isolated from the catamaran rails 131, 132 by a pair of slots 135, 136. Common cross rail 111 is parallel to leading edge 31. The left and right side rails 121, 122 of rail 119 extend perpendicularly from common cross-rail 111 to leading edge 31. Each includes a tapered portion 123, 124 adjacent to the leading edge 31 for further assisting slider lift-off. Left and right side rails 112, 113 of rail 109 extend perpendicularly in the opposite direction from cross rail 111. As is apparent from FIG. 8, the catamaran rails 131, 132 extend farther in the direction of the trailing edge 32 than the left and right side rails 112, 113. An island 117 is disposed adjacent to and centered with respect to the trailing edge 32 and provides a convenient surface for supporting a read/write transducer (not shown).

The slider shown in FIG. 9 is essentially the same as that of FIG. 8, with two exceptions. Each catamaran rail 161, 162 includes a flared portion 167, 168 which acts to increase roll stiffness. Moreover, the slider design has been optimized for a lower suspension preload than that of FIG. 8. Consequently, the LE pocket 150 has a narrower optimal width 156 than LE pocket 120, and island 147 is smaller and more streamlined than island 117.

Figure 11:
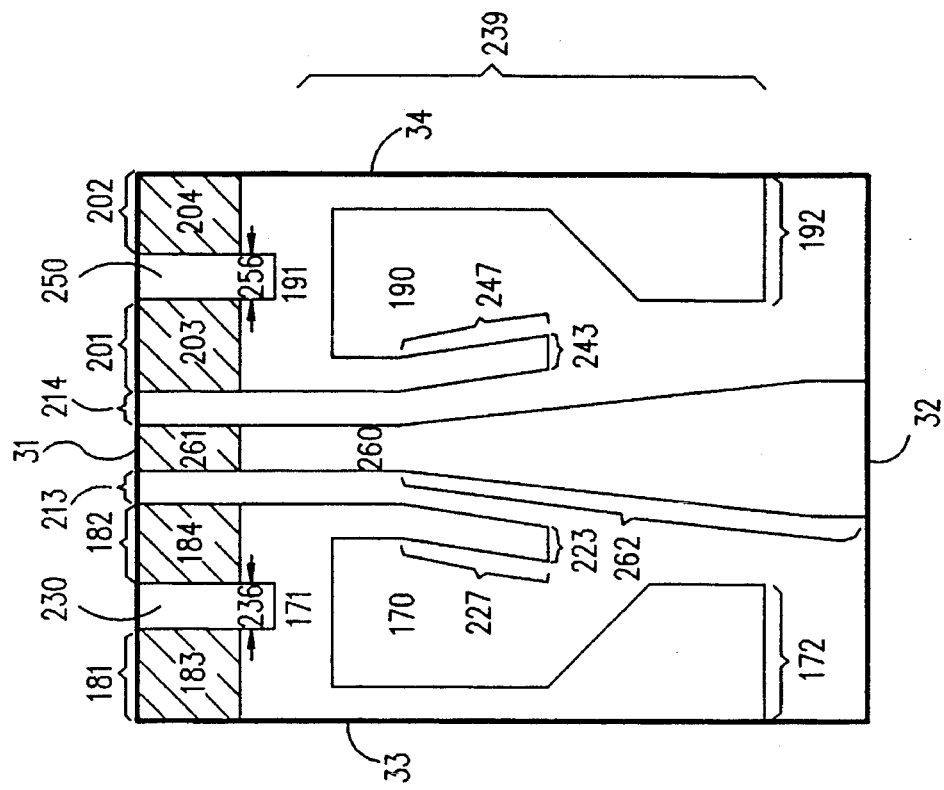
Figure 10:
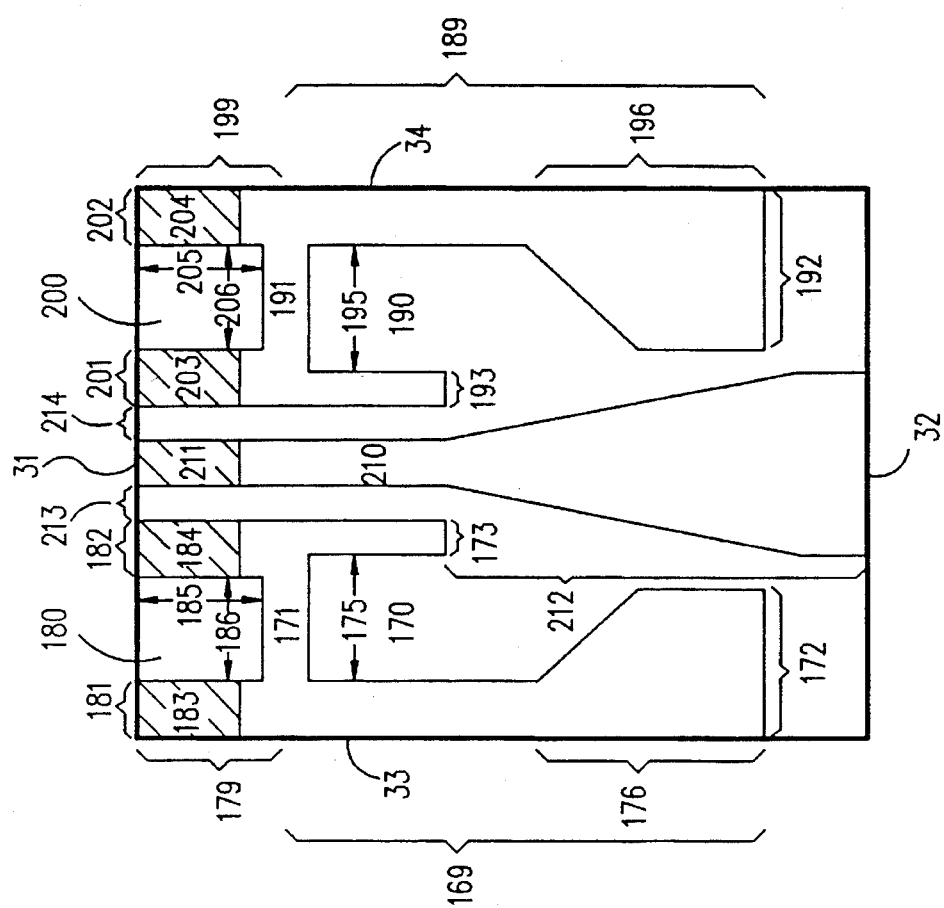

FIGS. 10 and 11 illustrate yet another TE pocket configuration with optimized LE pockets. In FIG. 10, left and right TE pockets 170, 190 are defined by generally U-shaped left and right rails 169, 189 with extended outer side rails 172, 192. The extended side rails 172, 192 run adjacent to respective left and right side edges 33, 34, and include flared portions 176, 196. A pair of LE pockets 180, 200 are defined by U-shaped rails 179, 199 abutting LE rails 169, 189. The side rails 181, 182, 201, 202 of LE rails 169, 189 extend to leading edge 31, and have tapered portions 183, 184, 203, 204 directly adjacent to the leading edge 31 for enhanced slider lift-off. The outer side rails 183, 204 are also adjacent to the left and right side edges 33, 34. A center rail 210 with a flared portion 212 and a tapered portion 211 extends from leading edge 31 to trailing edge 32. The center rail is isolated from the inner side rails 184, 173, 203, 193 by channels 213, 214. The LE pockets 180, 200 are selected in a manner similar to that described in the optimization example above. A series of prototype sliders having a pair of TE pockets identical to those of FIG. 10 are constructed by conventional methods. One prototype has no LE pockets. Each of the remaining prototypes includes a pair of identical LE pockets 180, 200 of fixed depth and length 185, 205, but of varying incremental widths. The LE pockets of a prototype may have identical or different widths. Average ID and OD fly heights for each prototype are measured and plotted to obtain ID and OD curves. In contrast to the previous example, however, two separate graphs are created. A first graph charts the ID and OD fly heights corresponding to incremental pocket width ratios of the left-hand pockets, i.e., LE pocket 180 to TE pocket 170. A second graph represents fly heights corresponding to the incremental ratios of the right-hand pockets, i.e., LE pocket 200 to TE pocket 190. The LE pocket width corresponding to the point of intersection of the curves in each graph provides the pocket width of the respective LE pocket to be incorporated in the slider design of FIG. 10.

The slider of FIG. 1t is essentially the same as that of FIG. 10, with the exception of inner side rails 223, 243 of the TE rails 219, 239, which include indented portions 227, 247 running parallel to the flared portion 262 of center rail 260. This design has been optimized for lower suspension preload and lower file RPM than that of FIG. 10. Consequently, the optimal LE pocket widths 236, 256 are much narrower than those of FIG. 10.

Figure 12:
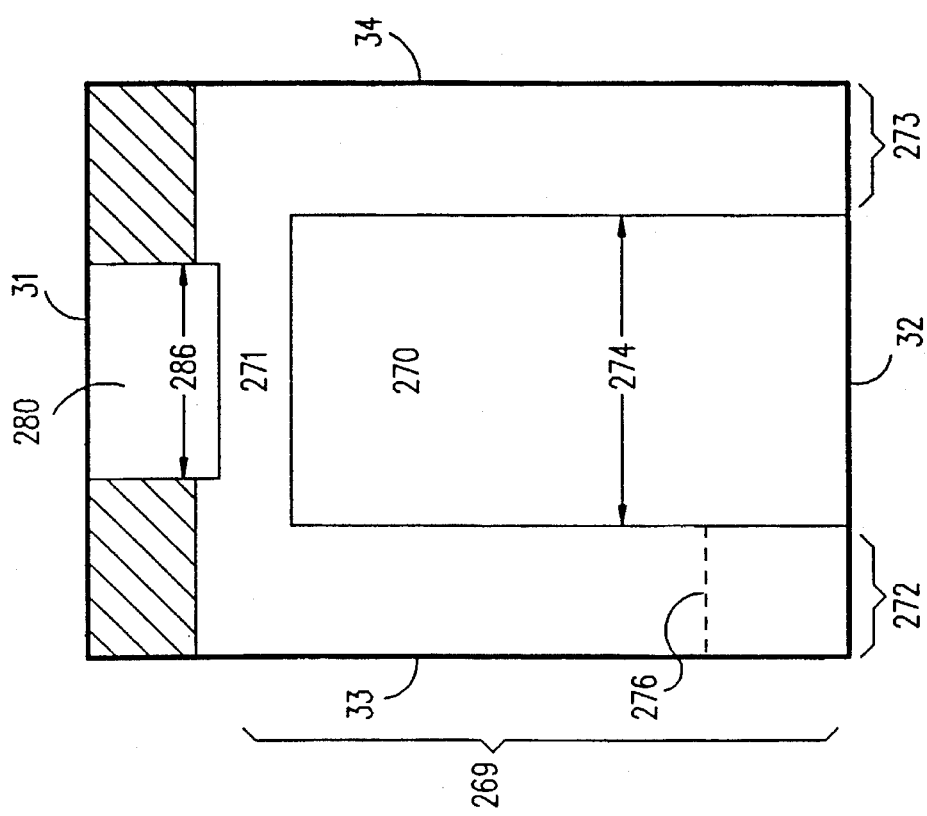

FIG. 12 shows a negative pressure slider design similar to that of FIG. 6. The side rails 272, 273 of TE rail 269 generate the positive pressure lift. The LE pocket 280 is narrower than the TE pocket 270. The ratio of the LE pocket width 286 to the TE pocket width 274 is optimized to flatten out the ID-OD head/disk spacing profile. The narrower LE pocket width 286 reduces the amount of negative load generated by the TE pocket 270, allowing control of the air bearing stiffness. The dashed line 276 illustrates the possibility of shortening either one of the side rails 272, 273 in order to raise the minimum slider flying height in skewed file environments. It should also be understood that both side rails may be shortened and a center island added at the trailing edge to accommodate centered transducer element designs.

Figure 13:
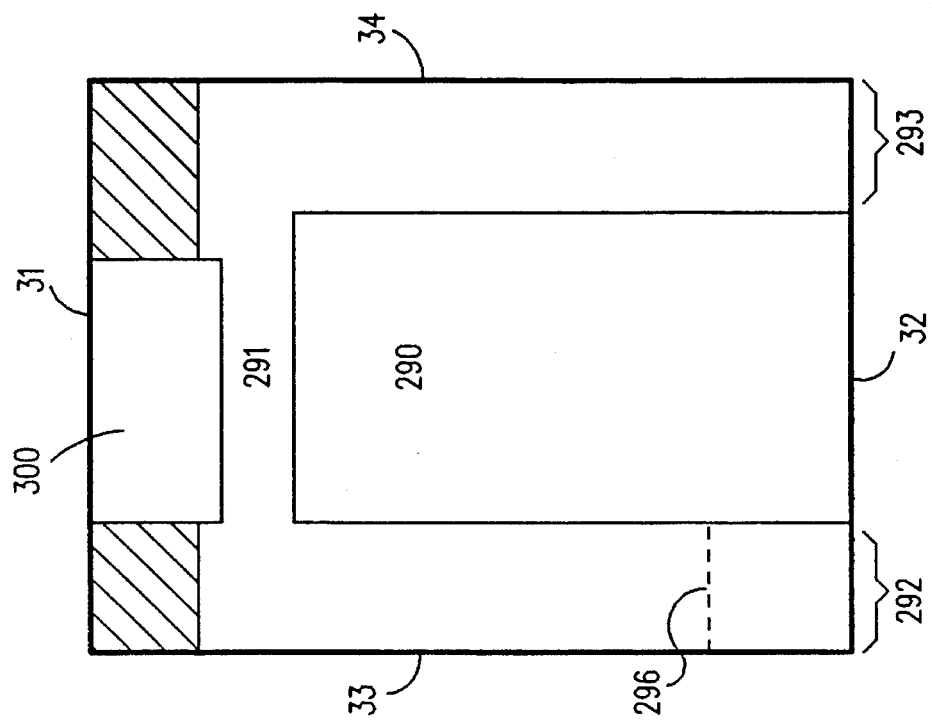

FIG. 13 shows a negative pressure slider design in which LE pocket 300 is offset to the left with respect to TE pocket 290. Such geometry provides optimal spacing profile control in highly asymmetric ID vs OD skew file environments. The offset LE pocket 300 serves to create a wider leading edge side rail 304 which generates an offsetting roll moment in the highly skewed condition. In an alternate embodiment, LE pocket 300 is offset to the right. As in FIG. 12, dashed line 296 indicates that one of the trailing edge side rails 292, 293 may be shortened.

Figure 14:
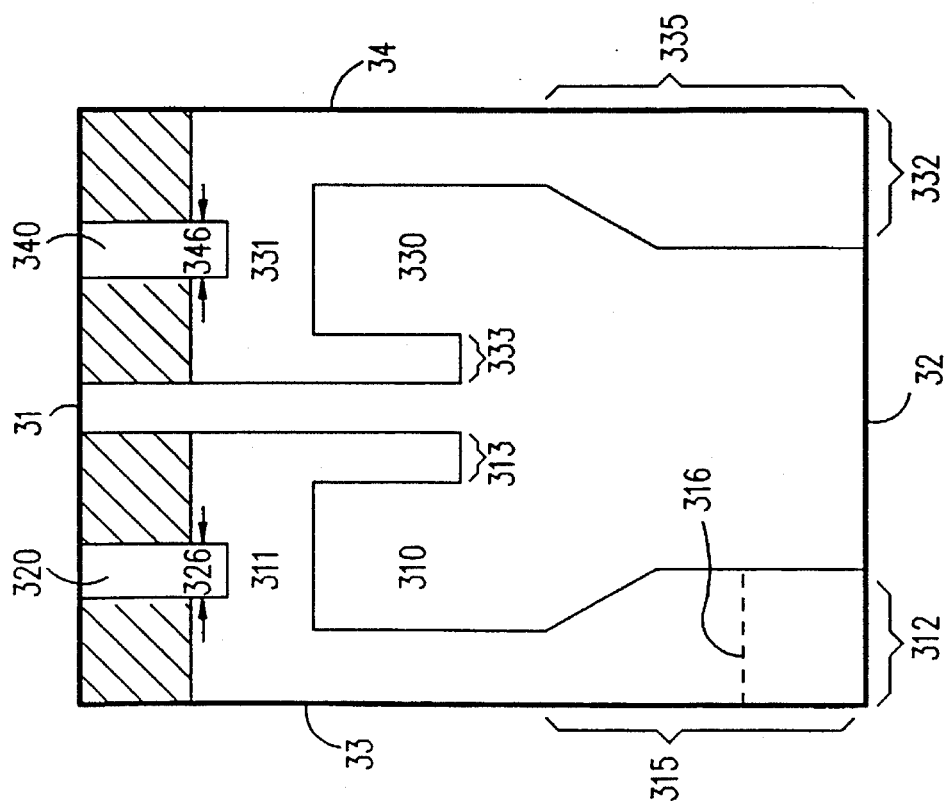

FIG. 14 illustrates a negative pressure slider design having two localized TE pockets 310, 330. Each pocket 310, 330 has an outer side rail 312, 332 extending along a respective side edge 33, 34 to the trailing edge 32 of the slider, and a shorter inner rail 313, 333. The outer rails include flared portions 315, 335 for controlling the magnitude and location of the generated negative pressure. The rail flares 315, 335 also help increase the slider pitch and roll stiffness. The design includes a pair of LE pockets 320, 340 corresponding to TE pocket 310, 330. The LE pockets widths 326, 346 may be optimized independently, as may the LE pocket offsets with respect to the TE pockets 310, 330 to achieve the desired ID-OD head/disk spacing profile. The dashed line 316 again indicates the option to shorten a TE pocket side rail.

Figure 15:
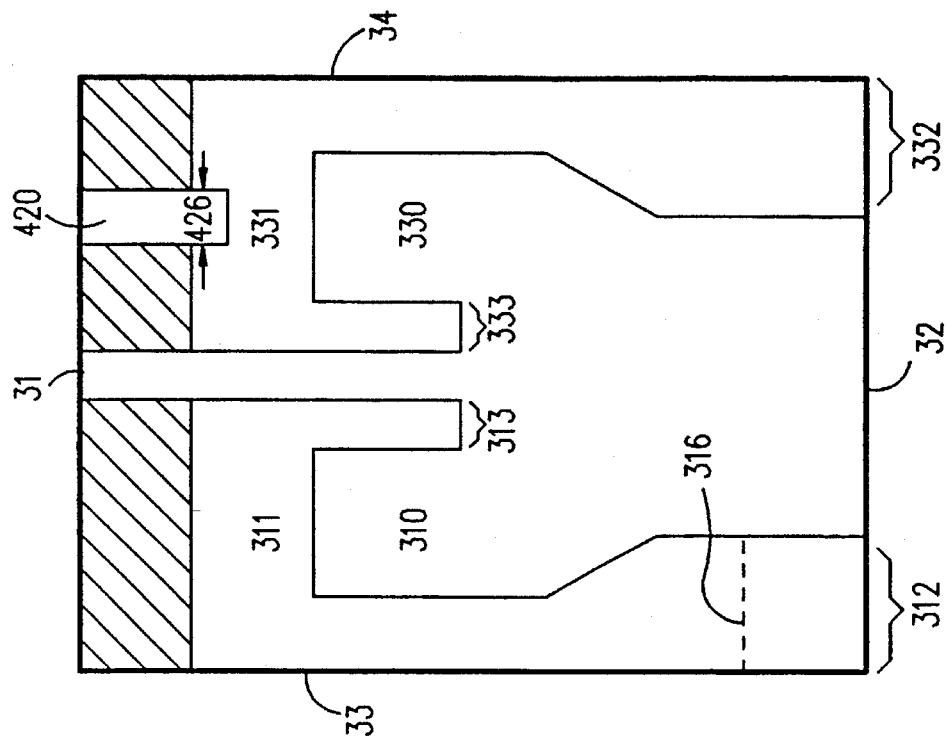

FIG. 15 shows the slider of FIG. 14 with a single LE pocket 420. The width 426 of the LE pocket 420 provides control of the negative pressure generated in TE pocket 330.

Figure 16:
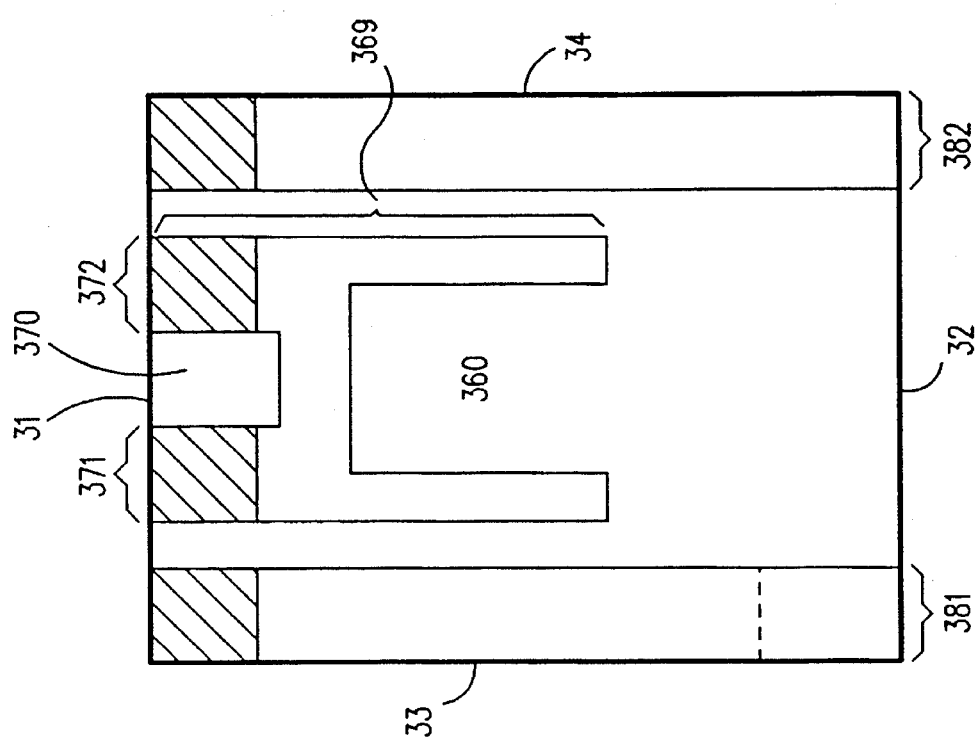

FIG. 16 shows a LE/TE pocket combination 369 disposed within two catamaran-type side rails 381, 382. The catamaran rails 381, 382 extend from leading edge 31 to trailing edge 32 along respective side edges 33, 34 of the slider. The pocket combination 369 is connected to the leading edge 31 by side rails 371, 372. It should be understood that the combination 369 need not be centered with respect to the catamaran rails 381, 382 and may be offset to either side to optimize skew performance. Likewise, the size of the combination and offset of LE pocket 370 with respect to TE pocket 360 may also be varied.

Figure 17:
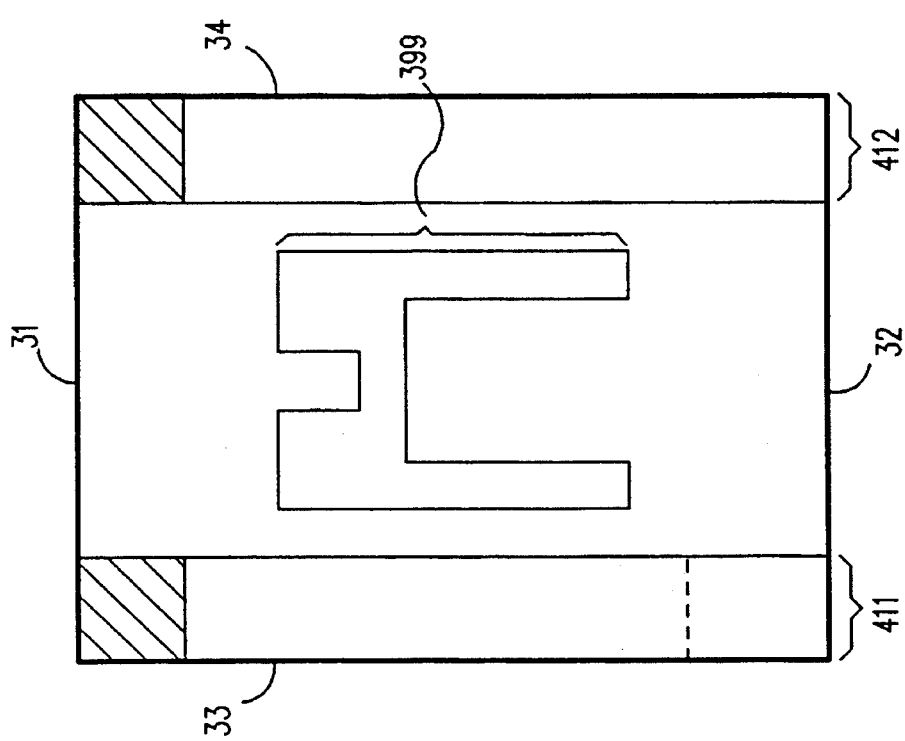

FIG. 17 shows a negative pressure slider design similar to that of FIG. 16 except that the LE/TE pocket combination 399 is not connected to the leading edge 31 of the slider. Again, it should be understood that the combination 399 may be varied in size, LE to TE offset, and offset with respect to catamaran rails 411, 412 to optimize skew performance.

It should further be understood that the dashed lines in FIGS. 12–17 indicate that one outer rail in each of the embodiments shown may be shortened in order to raise the minimum fly heights in skewed environments. Alternatively, both side rails may be shortened and a centered trailing edge island pad may be added in order to accommodate centered transducer element designs.

While a specific example of the method and a number of specific embodiments of the apparatus of the present invention have been described, it will be understood that various modifications and changes may be made to either without departing from the spirit and scope of the invention. Accordingly, the invention is not to be limited by the foregoing examples, but only by the scope of the following claims.

We claim:

1. A negative pressure air bearing slider for use in a disk drive, said slider including an air bearing surface, a leading edge at which an airflow of variable velocity enters said air bearing surface, a trailing edge from which said airflow exits said air bearing surface, and first and second side edges, said air bearing surface further comprising;

a TE pocket defined by a first generally U-shaped rail including a first cross rail, and a first pair of side rails extending from said first cross rail in the direction of said trailing edge;

a LE pocket of predetermined width defined by a second generally U-shaped rail including a second unvented cross rail, and a second pair of side rails extending from said second cross rail in the direction of said leading edge; and a center rail extending from said first cross rail to said trailing edge, said center rail partitioning said TE pocket into first and second negative pressure regions, the amount of said airflow entering each of said first and second negative pressure regions being determined by said predetermined width of said leading edge pocket and the velocity of said airflow.

2. The slider of claim 1, wherein the depth of said LE pocket is substantially equal to the depths of said first and second negative pressure regions.

3. The slider of claim 1, wherein said first and second U-shaped rails share a common cross rail.

4. The slider of claim 1, wherein each of said first pair of side rails is adjacent to a different one of said first and second side edges.

5. The slider of claim 1, wherein each of said second pair of side rails extends to said leading edge and includes a noncoplanar portion adjacent to said leading edge.

6. The slider of claim 1, wherein each of said second pair of side rails is adjacent to a different one of said first and second side edges.

* * * * *